United States Patent
Borde et al.

(10) Patent No.: US 6,752,423 B2
(45) Date of Patent: Jun. 22, 2004

(54) PROTECTIVE ASSEMBLY FOR A MOTOR VEHICLE PASSENGER'S LOWER LIMBS

(75) Inventors: Patrick Borde, Audincourt (FR); Laurent D'Emmanuelle, La Seyne sur Mer (FR); David Duquesnoy, Arbouans (FR); Eric Laspesa, Six Fours (FR)

(73) Assignees: SNPE, Paris (FR); Faurecia Industries, Audincourt (FR)

( * ) Notice: Subject to any disclaimer, the term of this patent is extended or adjusted under 35 U.S.C. 154(b) by 88 days.

(21) Appl. No.: 10/182,813

(22) PCT Filed: Mar. 6, 2001

(86) PCT No.: PCT/FR01/00669

§ 371 (c)(1),
(2), (4) Date: Aug. 2, 2002

(87) PCT Pub. No.: WO01/68409

PCT Pub. Date: Sep. 20, 2001

(65) Prior Publication Data

US 2003/0090096 A1 May 15, 2003

(30) Foreign Application Priority Data

Mar. 10, 2000 (FR) .............................................. 00 03132

(51) Int. Cl.[7] .............................................. B60R 21/04
(52) U.S. Cl. ....................................................... 280/753
(58) Field of Search ................................. 280/751, 752, 280/753

(56) References Cited

U.S. PATENT DOCUMENTS

| | | | | |
|---|---|---|---|---|
| 3,893,703 A | * | 7/1975 | Chika | 280/753 |
| 4,023,643 A | * | 5/1977 | Bagley, Jr. | 280/753 |
| 4,335,918 A | * | 6/1982 | Cunningham | 297/216.14 |
| 4,417,750 A | * | 11/1983 | Burry | 280/753 |
| 5,131,681 A | * | 7/1992 | Wetzel et al. | 280/753 |
| 5,344,184 A | * | 9/1994 | Keeler et al. | 280/730.1 |
| 5,374,105 A | * | 12/1994 | Kracht et al. | 297/216.1 |
| 5,476,283 A | * | 12/1995 | Elton | 280/753 |
| 5,496,066 A | * | 3/1996 | Hoffmann et al. | 280/753 |
| 5,632,507 A | * | 5/1997 | Sinner et al. | 280/751 |
| 5,695,242 A | * | 12/1997 | Brantman et al. | 297/216.1 |
| 6,283,508 B1 | * | 9/2001 | Nouwynck et al. | 280/753 |
| 6,464,246 B2 | * | 10/2002 | Bayley | 280/728.1 |
| 6,641,166 B2 | * | 11/2003 | Browne et al. | 280/752 |

FOREIGN PATENT DOCUMENTS

| | | | | |
|---|---|---|---|---|
| DE | 4243791 A1 | * | 6/1994 | 280/753 |
| JP | 02-182553 | * | 7/1990 | |
| JP | 03-182851 | * | 8/1991 | |

* cited by examiner

Primary Examiner—Paul N. Dickson
Assistant Examiner—Deanna Draper
(74) Attorney, Agent, or Firm—Oliff & Berridge, PLC

(57) ABSTRACT

The invention concerns a protective assembly (1, 101) for the lower limbs (31) of a motor vehicle passenger comprising an actuating device (2, 103) secured to the vehicle and capable of displacing a rod (3, 108) which is linked to a protective system. The invention is characterized in that: i) the actuating device contains a pyrotechnic system (9); ii) the protective system comprises a protective cushion (6) mounted on a shaft (5, 105) integral with the vehicle; iii) said protective cushion is mobile in rotation under the effect of the displacement of the rod so as to accompany, in the contact zone provided between the passenger's lower limbs and said protective cushion, the movement of said lower limbs.

19 Claims, 4 Drawing Sheets

PROTECTIVE ASSEMBLY FOR A MOTOR VEHICLE PASSENGER'S LOWER LIMBS

The present invention relates to the field of motor vehicle safety and relates more specifically to a protective assembly intended to deploy a protective cushion which serves to block the lower limbs of an occupant of a motor vehicle in an accident.

In order to limit as far as possible the risk of bodily injury run by the occupants of a motor vehicle in the event of a frontal or side impact, the incorporation of gas-generating systems into vehicles so as to inflate protective cushions able to protect the head and thorax of the occupants has been proposed now for about thirty years.

Recently, numerous patent applications have appeared regarding protective assemblies included in the lower part of the dashboard and designed to block the lower limbs of the occupant in a collision so that, on the one hand, said lower limbs are protected and, on the other hand, the occupant cannot slide along the seat in which he is sitting and be injured by the seat belt or, as appropriate, by an inflatable protective cushion.

These various protective assemblies may be classified broadly into three categories. The first category contains protective assemblies which call upon a gas generator mounted fixedly in the lower part of the dashboard and intended to inflate a protective cushion designed to come into direct contact with the occupant's lower limbs. However, these protective cushions, which are situated near plastic or metal elements, may become damaged by such elements in the event of a collision. Such assemblies are, for example, described in patent application DE 39 34588 and in U.S. Pat. No. 5,458,366.

The second category contains protective assemblies which contain a gas generator intended to inflate a protective cushion which itself actuates a plate designed to come into contact with the occupant's lower limbs. However, these assemblies, which are described for example in Patent Applications EP 0 684 164 and EP 0 820 905, on the whole have excessively high manufacturing costs and occupy too much space. The third category contains protective assemblies which resort to no inflatable protective cushion. U.S. Pat. No. 5,409,260 and U.S. Pat. No. 4,951,963 for example disclose protective assemblies including a plate which can be moved in the event of an impact so as to meet the occupant's lower limbs, it being possible for this plate to be actuated pneumatically or mechanically. However, as the maximum deployment of the plate has to be achieved in the ten milliseconds or so following collision, it then follows that said plate is brought up to speed, in the opposite direction to the direction of the lower limbs, extremely sharply during this space of time and that the plate is then likely to injure the occupant's lower limbs if these strike said plate before it is fully deployed.

The person skilled in the art is therefore still looking for an assembly for protecting the lower limbs of an occupant that makes it possible to alleviate the various problems mentioned previously.

The object of the invention is to meet this expectation and the invention relates to a protective assembly for protecting the lower limbs of an occupant of a motor vehicle, comprising an actuating device secured to the vehicle and able to cause the movement of a sliding means which is connected to a protective system intended to switch from a retracted storage position to a protecting position, characterized in that i) the actuating device contains a pyrotechnic assembly comprising a pyrotechnic charge with which an ignition device is associated, ii) the protection system comprises a shock-absorbing protective cushion mounted on a shaft which is secured to the vehicle, iii) this protective cushion is able to move in rotation under the effect of the movement of the sliding means so as to accompany the movement of said lower limbs in the anticipated area of contact between the lower limbs of the occupant and said protective cushion.

Thus, this protective assembly, which is able to ensure full deployment of the protective cushion in a period of time of the order of 10 milliseconds, allows a great reduction in the risk of injury to the lower limbs when, bearing in mind the particular positioning of the occupant on his seat at the time of the collision, the impact occurs in the instants preceding full deployment of the protective cushion. What actually happens is that, at that moment, this protective cushion is given a movement not in the opposite direction to that of the lower limbs but which accompanies the movement of said lower limbs. In all cases, the effect of the protective cushion is to absorb some of the energy introduced through the impact.

It should be noted that a protective assembly according to the invention may comprise a shaft which can move in rotation under the effect of the movement of the sliding means and to which a protective cushion is fixedly attached. However, one possible alternative form of embodiment may consist in the use of a shaft which is permanently fixed and on which there is mounted a protective cushion that can move in rotation about this shaft under the effect of the movement of the sliding means. The other structural differences to be made to the protective assembly in order to take account of this alternative form of embodiment will not necessarily all be described hereinafter.

Advantageously, the actuating device consists of a linear pyrotechnic tension ram and the sliding means has, on the one hand, a first end connected to a moving part housed in said ram and, on the other hand, a second end connected to the shaft. In the alternative form mentioned earlier, the second end of the sliding means would then be connected to the protective cushion.

It should be noted that, depending on the geometry of the cabin, it may be necessary to use a linear pyrotechnic thrust ram in place of the linear pyrotechnic tension ram.

Bearing in mind the constant increase in the number of protective systems carried on board a vehicle, another object of the invention is to propose a protective assembly that is of small size. For that, the sliding means is advantageously attached to an element that can move in rotation which is connected to the shaft, this moving element preferably consisting of at least one link rod. Hence, by virtue of this moving element, the movement of the sliding means is manifested at the shaft and therefore at the protective cushion by a large-amplitude rotation which causes this cushion to move from a very retracted storage position into a position of maximum protection, this rotation advantageously being through more than 90 degrees.

Advantageously, the actuating device and the moving element are attached to a fixed armature.

According to a first preferred alternative form of the invention, the sliding means consists of a rigid rod and the actuating device is able to rock about a rotation spindle.

According to a second preferred alternative form of the invention, the sliding means consists of a flexible cable.

Advantageously, the actuating device lies in a plane perpendicular to the shaft.

A protective assembly according to the invention may also comprise a braking device which is able to cause a sharp decrease in the speed of the protective cushion at the end of operation. This device then makes it possible to greatly reduce the probability of the protective cushion bouncing back at the end of operation. This braking device may for example be produced using a first metal part which is attached to the actuating device and which acts as a stop for a second metal part mounted on the sliding means. The first metal part is preferably in the shape of a bell and the second metal part preferably consists of a nut secured to the sliding means.

An assembly according to the invention may also contain a blocking device intended to block the protective cushion when it is fully deployed. Several exemplary embodiments of this blocking device will be expanded upon later on in this patent application. This device may incidentally have the effect of supplementing the action of the braking device.

As a preference, the protective cushion is produced in the form of a body having two ends, each of them being fixed to the shaft by means of a fixing lug.

A protective assembly according to the invention, apart from making it possible to very greatly reduce the risk of injury during the impact, and of occupying only a small volume, has the advantage of having only a small number of mechanical parts which are easy to assemble, thus giving this assembly a low cost of manufacture.

The present invention also relates to an actuating device intended to be incorporated into such a protective assembly, characterized in that it comprises:

i) a body in which, during operation, a moving part to which a rod is attached can slide,
ii) a braking device which is able to cause a sharp reduction in the speed of travel of the moving part at the end of operation,
iii) a blocking device intended to block the moving part at the end of operation.

According to a first feature of the invention, said rod may consist of a rigid rod or of a flexible cable.

Advantageously, the braking device is produced using a first metal part which is attached to the body and which acts as a stop for a second metal part mounted on the rod. The first metal part is preferably produced in the form of a bell and the second metal part may consist of a nut. In such an embodiment, as the bell is made to deform under the impact of the nut, it is then possible for said bell and said nut to be configured in such a way that the nut is held captive in the deformed bell. It then follows that, in such a case, the bell and the nut constitute both the braking device and the blocking device.

Furthermore, the blocking device may for example be produced using elastic tabs carried by the side wall of the body, said elastic tabs being intended to close back up, at the end of operation, onto a groove that the moving part has.

This actuating device therefore has the advantage, on the one hand, of having a moving part whose speed of movement is greatly reduced at the end of its travel and, on the other hand, of avoiding any movement of said moving part in the opposite direction at the end of operation.

One exemplary embodiment of the invention is described hereinafter in FIGS. 1 to 9.

Figure 1:
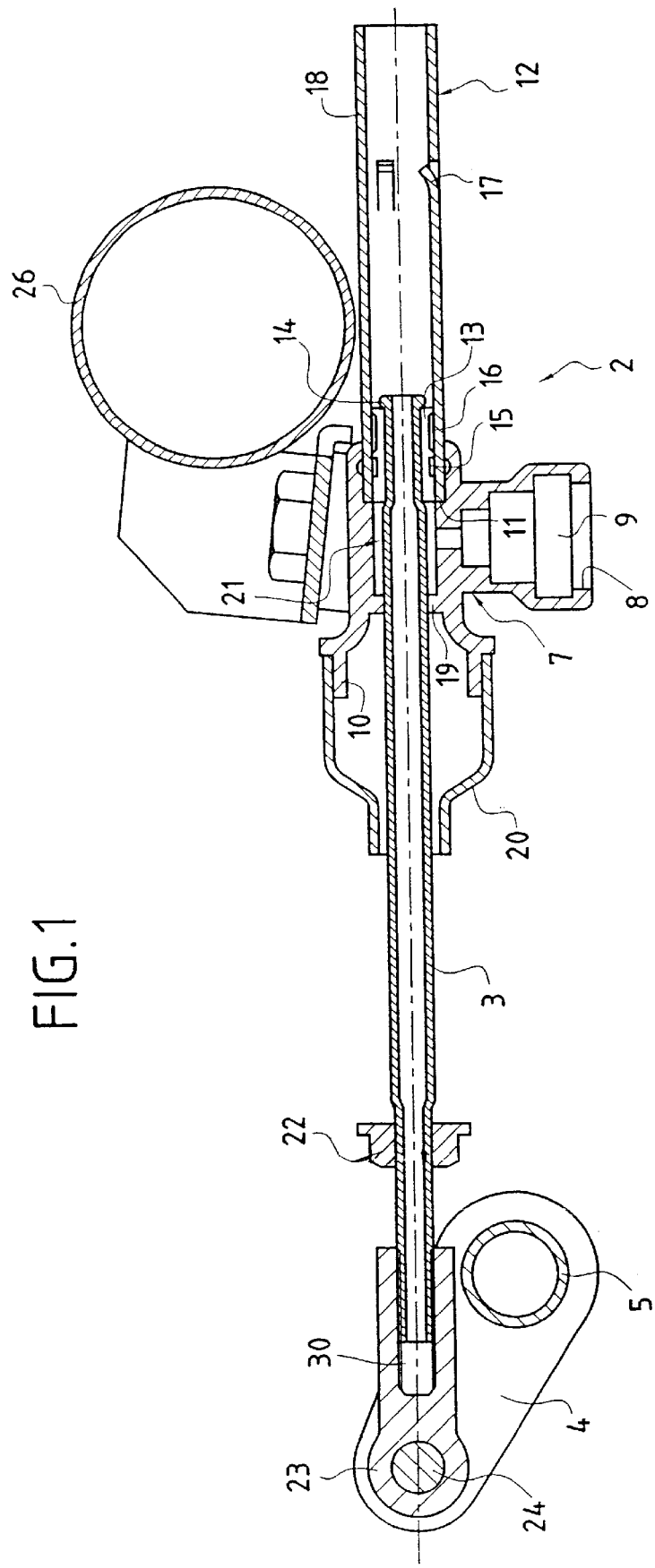
FIG. 1 is a longitudinal view of one exemplary embodiment of a protective assembly, with the protective cushion omitted, the rod, in this example, being fixed into a moving part which is itself attached to the link rod.

Refering to FIGS. 1 to 4 of this patent application, it can be seen that one exemplary embodiment of a protective assembly 1 according to the invention is made using a linear pyrotechnic tension ram 2 which is connected, via the interposition of a rigid rod 3, to a link rod 4 itself mounted on a shaft 5 with which a protective cushion 6 made of polyurethane foam is associated. The ram 2 has a rotation spindle 27 to which is attached a connecting element 28 which is fixed in a metal crossmember 26 secured to the vehicle. Likewise, the shaft 5 is attached to said metal crossmember 26 by means of a metal framework 29.

Refering more particularly to FIG. 1, it can be seen that the ram 2 is made of a metal part 7 which has, on the one hand, a radial opening 8 in which is inserted a pyrotechnic assembly 9 comprising a pyrotechnic charge with which an ignition device is associated and, on the other hand, an open first widened end 10 and an open second end which, as a setback, has an external shoulder 11. A metal tube 12, equipped with a side wall 18, with two open ends and containing, at its first open end, a piston 13 produced in the form of a cylindrical metal body having a diameter slightly smaller than that of the tube 12, is partially inserted and then fixed into the second open end of the metal part 7 so as to abut against the external shoulder 11. More specifically, the piston 13 is provided, on the one hand, with a central channel in which a first end 14 of the rod 3 is fixed and, on the other hand, with an annular seal 15 and an annular groove 16. Near its second open end, the tube 12 also has elastic tabs 17 which converge and which are cut from the side wall 18. Set back from its widened first end 10, the metal part 7 has an internal shoulder 19 through which the rod 3 passes, said internal shoulder 19 and said rod 3 having almost identical diameters. An annular seal, not depicted, is fixed against the internal shoulder 19 and inside the metal part 7 so as to initially seal a combustion chamber 21 delimited by said metal part 7, the piston 13 and said internal shoulder 19. A metal element 20 in the shape of a bell and having, on the one hand, a first end the diameter of which is similar to that of the widened end 10 of the metal part 7 and, on the other hand, a second end of smaller diameter, is fixed by welding, at its first end, to said widened end 10. A nut 22, of a diameter greater than that exhibited by the second end of the metal element 20, is welded to the rod 3 and the latter ends in a second end 30 screwed into a moving part 23 which has an internal screw thread. This moving part 23 is mounted on a rotation spindle 24 itself secured to the link rod 4 which is mounted on the shaft 5.

Figure 2:
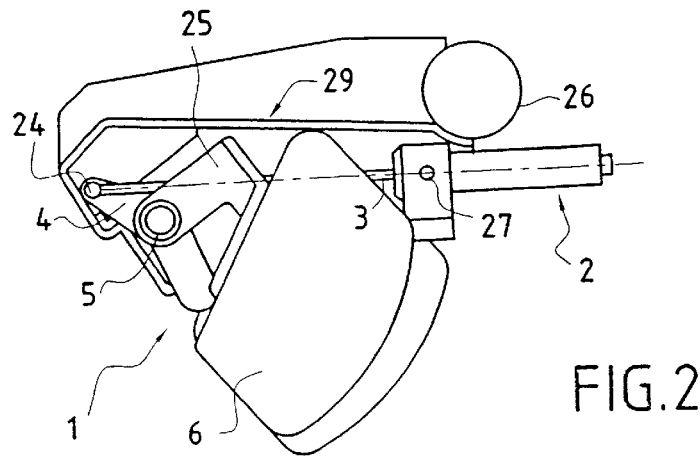
FIG. 2 is a longitudinal view of the protective assembly depicted in FIG. 1, fitted with the protective cushion and prior to operation, a first modification consisting in the fact that the rod is fixed directly to the link rod and a second modification conssting in the fact that the braking device has been omitted.
Figure 3:
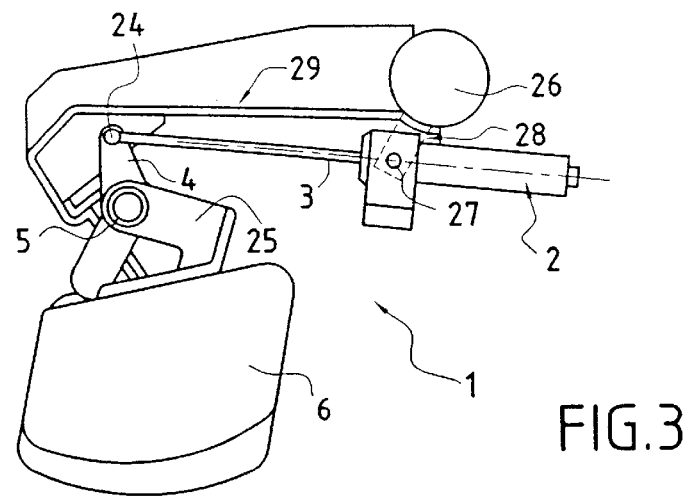
FIG. 3 is a longitudinal view of the protective assembly depicted in FIG. 2, during operation.
Figure 4:
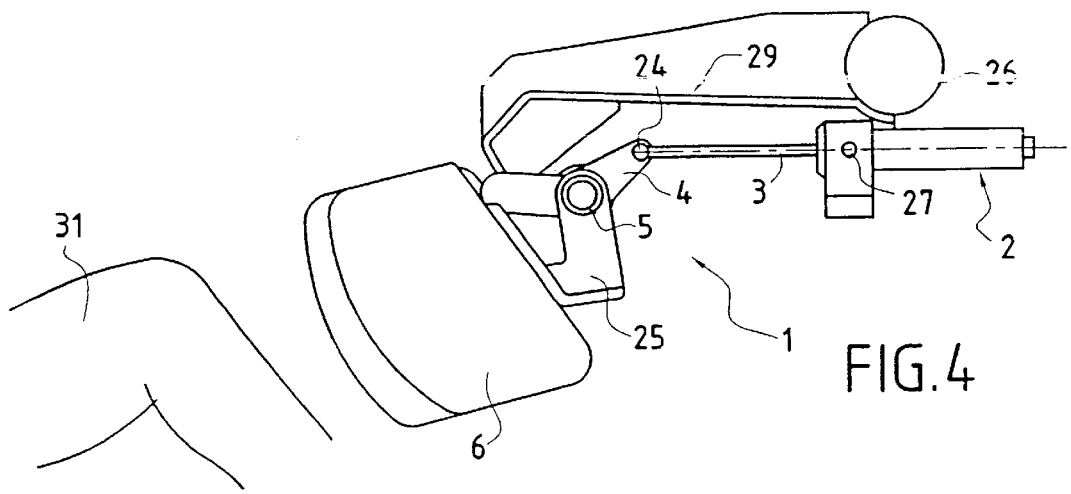
FIG. 4 is a longitudinal view of the protective assembly depicted in FIG. 2, at the end of operation.
Figure 5:
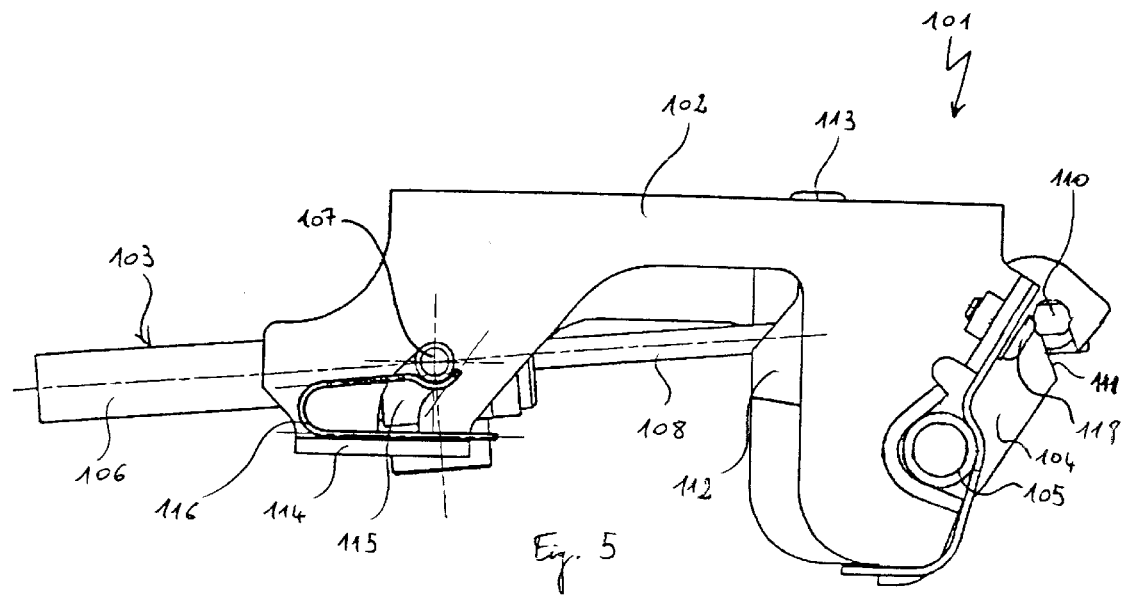
FIG. 5 is a longitudinal external view of another exemplary embodiment of a protective assembly with the protective cushion omitted.
Figure 6:
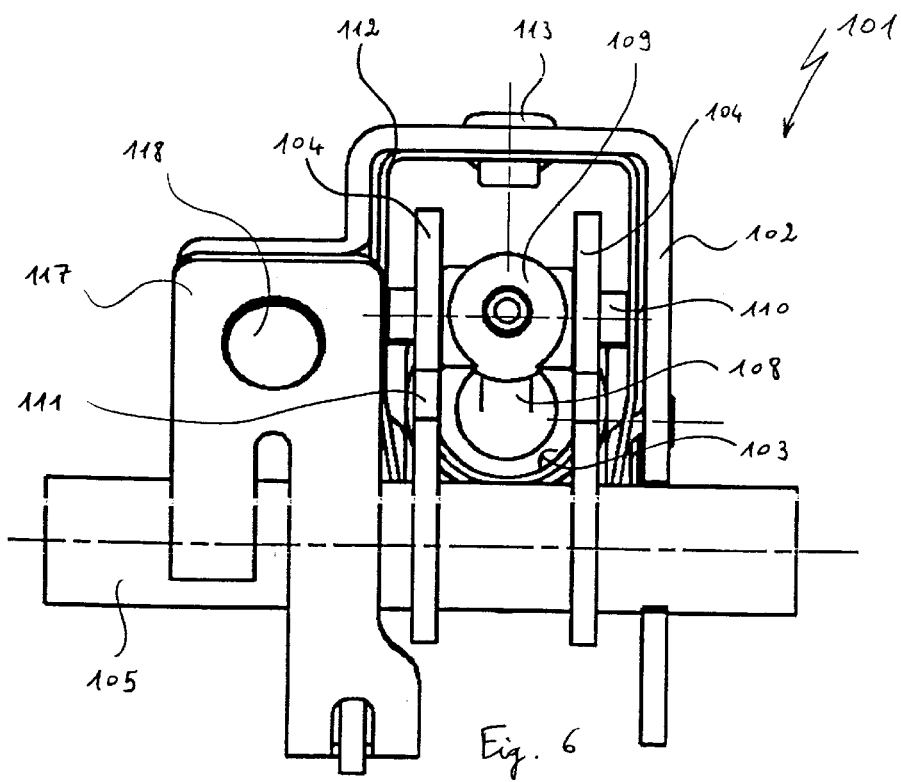
FIG. 6 is an axial external view of the protective assembly depicted in FIG. 5.
Figure 7:
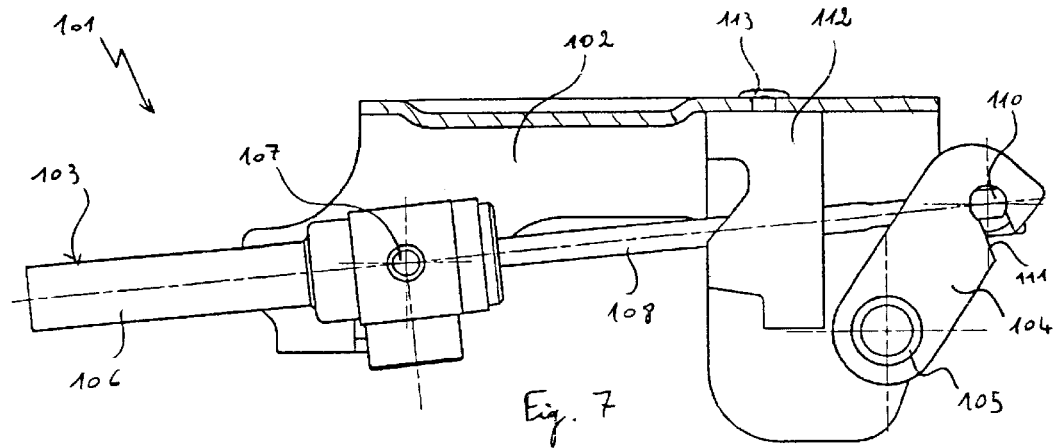
FIG. 7 is a longitudinal external view of the protective assembly depicted in FIG. 5, the front face of the armature having been omitted, and the protective assembly having not yet operated.

Refering more specially to FIGS. 2 to 4, it can be seen that the protective cushion 6 has an elongate shape and has two ends each of which is attached to said shaft 5 by means of a fixing lug 25. Initially, the ram 2 and the rotation spindle 24 lie in a plane inclined by about 5 degrees with respect to the horizontal plane and, in this inclined plane, are perpendicular to one another.

When a collision entailing deployment of the protective cushion 6 in order to afford effective protection to the lower limbs 31 of the occupant of the vehicle occurs, the protective assembly 1 works as follows: A triggering command is transmitted to the pyrotechnic assembly 9 and initiates the combustion of the pyrotechnic charge. This then generates combustion gases in the combustion chamber 21 and these force the piston 13 to move along the side wall 18 of the tube 12. The moving part 23 is thus made to turn about its rotation spindle 24 under the effect of the movement of the piston 13 and of the rod 3. This moving part 23 drives with it the link rod 4 which itself causes the shaft 5 and therefore the protective cushion 6 attached to it to rotate. As can be seen more particularly in FIG. 3, the rotating of the moving part 23 and of the link rod 4 are made possible by virtue of the rocking movement of the ram 2 about its rotation spindle 27. As can be deduced from FIGS. 3 and 4, the protective cushion 6 is given an upward movement which accompanies the movement of the lower limbs 31 of the occupant from the moment it enters the cabin of the vehicle. It therefore follows that, even if the lower limbs 31 meet the protective cushion 6 before it is fully deployed, this impact will not cause injury as it could if said lower limbs 31 and said protective cushion 6 were moving in opposite directions at that moment. At the end of operation, the nut 22 strikes the second end, of smaller diameter, of the metal element 20, which deforms under the impact, and this has the effect of causing a sharp reduction in the speed of the protective cushion 6 in the instants preceding its maximum deployment. In parallel with that and at the end of operation, the convergent elastic tabs 17 close back up onto the annular groove 16 of the piston 13 and allow the latter to be held fixedly in that position. In normal operation, it is then not until that moment that the lower limbs 31 strike the protective cushion 6, and this has the effect of absorbing some of the energy introduced through the impact.

Referring to FIGS. 5 to 9, a protective assembly 101 according to another exemplary embodiment of the invention comprises an armature 102, a linear pyrotechnic tension ram 103 and a pivoting means of attachment in the form of two identical, flat and mutually parallel link rods 104. Said link rods 104 are bored in such a way as to accommodate a shaft 105 to which there is attached a protective cushion (not depicted) as described above. The ram 103 has a cylindrical body 106 equipped with two diametrically opposed cylindrical protrusions 107 and a sliding rod 108 which is attached to the ram 103 as described in the previous example. A rigid hollow cylindrical part 109 is pushed into the free end of the sliding rod 108 of the ram and has two diametrically opposed lateral studs 110 each having two flats and two rounded edges. Each link rod 104 has a roughly straight slot 111 and is arranged within the protective assembly 101 in such a way that the two studs 110 of the hollow cylindrical part 109 come into abutment at the end of said slots 111, the ends of which slots are rounded. If it is assumed that the upstream part of the armature 102 is situated on the same side as the cylindrical body 106 of the ram 103 and its downstream part is situated on the same side as the sliding rod 108, then the protective assembly 101 has a blocking device in the form of a stirrup-shaped part 112 which has a gradual narrowing, said part 112 being fixed to the downstream part of the armature 102 by means of a screw 113. The armature 102 consists of an elongate steel part with a U-shaped cross section of variable depth. The upstream part of the armature 102 has a U-shaped cross section of which the end of each of the two faces facing each other is bent to form a rim 114 at right angles.

Each of the two faces of the armature 102 has a slot 115 starting at the bent-over rim 114 and ending in each of the two faces in a rounded end. Said slots 115 are curved slightly toward the downstream part of the armature 102. The ram 103 is positioned in the armature 102 in such a way that each of its two protrusions 107 are in abutment at the ends of each of said slots 115, said ram 103 being held in this position by means of a compression member consisting of a single pin 116, bent under stress, and placed between the edges at right angles 114 of the armature 102 and the protrusions 107 of the ram 103 which emerge from said slots 115. Said pin 116 has two parts in the form of an arc of a circle intended to come into contact with the cylindrical protrusions 107 of the body 106 of the ram 103. The armature 102 has a lateral part 117 forming a loop which can be tightened by means of a screw 118, said loop 117 gripping the shaft 105 which is to be pivoted. The protective assembly 101 can then be fixed (not depicted) at its armature 102, to a crossmember of the vehicle.

Figure 8:
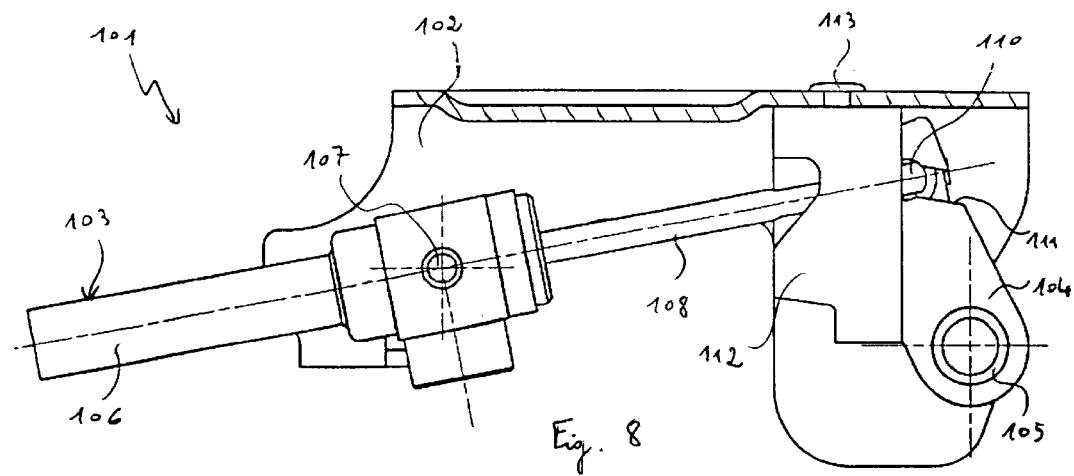
FIG. 8 depicts the protective assembly of FIG. 7 in the process of operating.
Figure 9:
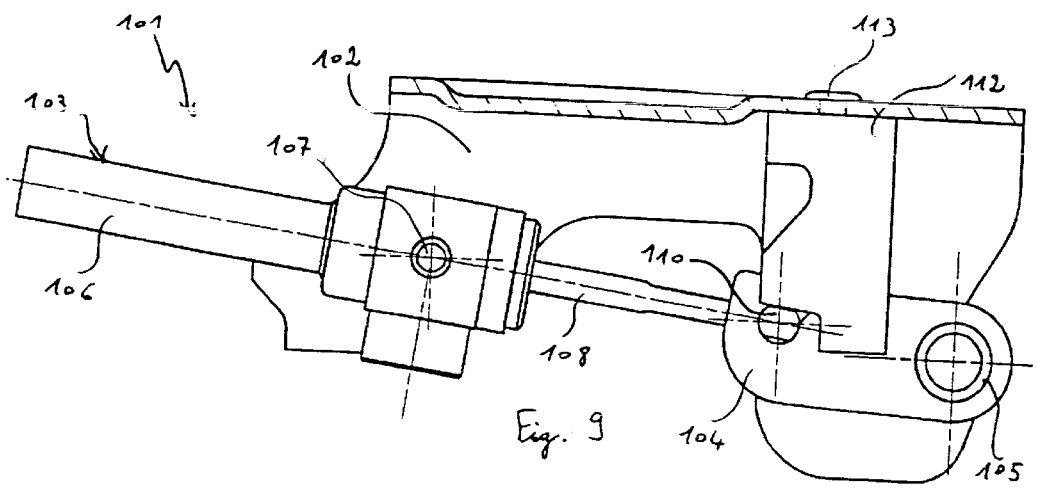
FIG. 9 depicts the protective assembly of FIG. 7 at the end of operation.

In the event of a collision entailing the deployment of the protective cushion in order to afford effective protection to the lower limbs of the occupant of the vehicle, the way in which the protective assembly 101 works is as follows: A triggering command is transmitted to the pyrotechnic assembly and initiates the combustion of the pyrotechnic charge. The latter therefore generates combustion gases which cause the sliding rod 108 to retract. This retraction leads to the rotation of the two link rods 104 about the shaft 105 which is to be pivoted and to which the protective cushion is attached. The rotating of the link rods 104 causes rotation of the ram 103 the body 106 of which is blocked in terms of translation by means of the protrusions 107 placed at the end of the slot 115. Referring to FIG. 8, the two studs 110 of the hollow cylindrical part 109 pushed into the sliding end 108 of the ram 103 and which emerge laterally from the two link rods 104, enter the stirrup-shaped part 112 at its widest part. The movement continues in the stirrup 112 while the friction forces increase as a result of the reduction in cross section of said stirrup 112. Referring to FIG. 9, the studs 110 end up re-emerging from the stirrup 112 while the hollow cylindrical part 109 previously held in compression in the small cross section of the stirrup 112 elastically relaxes. This elastic relaxation allows the studs 10 to emerge laterally from the stirrup 112, preventing any return of the movement in the opposite direction. The increase in the friction forces in the stirrup 112 results in a phase of braking of the shaft 105 which turns on itself.

Thus, the protective cushion (not depicted) is given an upward movement which accompanies the movement of the occupant's lower limbs from the instant it enters the cabin of the vehicle. It therefore follows that, even if the lower limbs meet the protective cushion before it is fully deployed, this impact will not cause injury as it could if said lower limbs and said protective cushion were moving on opposed paths at that moment.

In normal operation, it is not until the two studs 110 have passed completely through the stirrup 112 and the blocking device is therefore active that the lower limbs strike the protective cushion, and this has the effect of absorbing some of the energy introduced through the impact.

What is claimed is:

1. A protective assembly for protecting the lower limbs of an occupant of a motor vehicle, comprising:

an actuator device secured to the vehicle and containing a pyrotechnic assembly composed of a pyrotechnic charge and of an ignition device;

a sliding means, the actuator device being capable of causing movement of the sliding means; and a protective system, connected to the sliding means, intended to move from a retracted storage position to a protective position, the protective system comprising:

a protective cushioning pad mounted on a shaft secured to the vehicle, wherein, when the actuating device is triggered, the protective pad rotates about the shaft through at least 90° so its deployment accompanies the movement of the lower limbs.

2. The protective assembly according to claim 1, wherein the actuator device comprises a pulling linear pyrotechnic ram, and the sliding means has a first end connected to a moving part housed in the ram and a second end connected to the shaft.

3. The protective assembly according to claim 2, wherein the moving part comprises a piston which can slide inside a combustion chamber under the action of gases released by combustion of the pyrotechnic charge, the piston has a groove, and the combustion chamber has a side wall bearing elastic tabs intended to engage the groove at the end of travel of the piston.

4. The protective assembly according to claim 1, wherein the sliding means is attached to an element that is connected to and rotates with the shaft.

5. The protective assembly according to claim 3, wherein the actuating device and the element are attached to a fixed armature.

6. The protective assembly according to claim 3, wherein the element comprises at least one link rod.

7. The protective assembly according to claim 1, wherein the sliding means comprises a flexible cable.

8. The protective assembly according to claim 1, wherein the sliding means comprises a rigid rod, and the actuator device is able to pivot about an axis of rotation.

9. The protective assembly according to claim 1, wherein the actuator device is situated in a plane perpendicular to the shaft.

10. The protective assembly according to claim 1, further comprising a braking device capable of bringing about a rapid reduction in the speed of the protective pad at the end of the operation.

11. The protective assembly according to claim 10, wherein the braking device is made using a first metal part which is attached to the actuator device and which acts as an end stop for a second metal part mounted on the sliding means.

12. The protective assembly according to claim 11, wherein the first metal part is bell-shaped and the second metal part comprises a nut secured to the sliding means.

13. The protective assembly according to claim 1, further comprising an immobilizing device intended to immobilize the protective pad when it is fully deployed.

14. The protective assembly according to claim 13, wherein the moving element comprises two link rods, the sliding means ends in a cylindrical part having two studs which are used to attach the sliding means to the said link rods, and further comprising a stirrup-shaped part that collaborates with the two studs so that the two studs cannot move back in the opposite direction once they have passed through the stirrup-shaped part.

15. The protective assembly according to claim 1, wherein the protective pad is made in the form of a body with two ends, each of them fixed to the shaft by means of a fixing lug.

16. An actuator device intended to be incorporated into a protective assembly as claimed in claim 1, wherein the actuator device is produced using a pulling linear pyrotechnic ram which comprises:

a moving part;

a rod attached to the moving part;

a body in which, during operation, the moving part to which the rod is attached, can slide;

a braking device capable of bringing about a swift reduction in the speed of travel of the moving part at the end of operation; and an immobilizing device intended to immobilize the moving part at the end of operation.

17. The actuator device according to claim 16, wherein the braking device comprises:

a first metal part which is attached to the body; and a second metal part mounted on the rod, the first metal part acting as an end stop for the second metal part.

18. The actuator device according to claim 17, wherein the first metal part is bell-shaped and the second metal part comprises a nut.

19. The actuator device according to claim 16, wherein the body has a side wall comprising elastic tabs intended to engage a groove borne by the moving part at the end of operation.

* * * * *